Aug. 6, 1929.  R. A. WALKER  1,723,102
AUTOMATIC CUT-OFF VALVE MECHANISM
Filed April 3, 1926  2 Sheets-Sheet 2
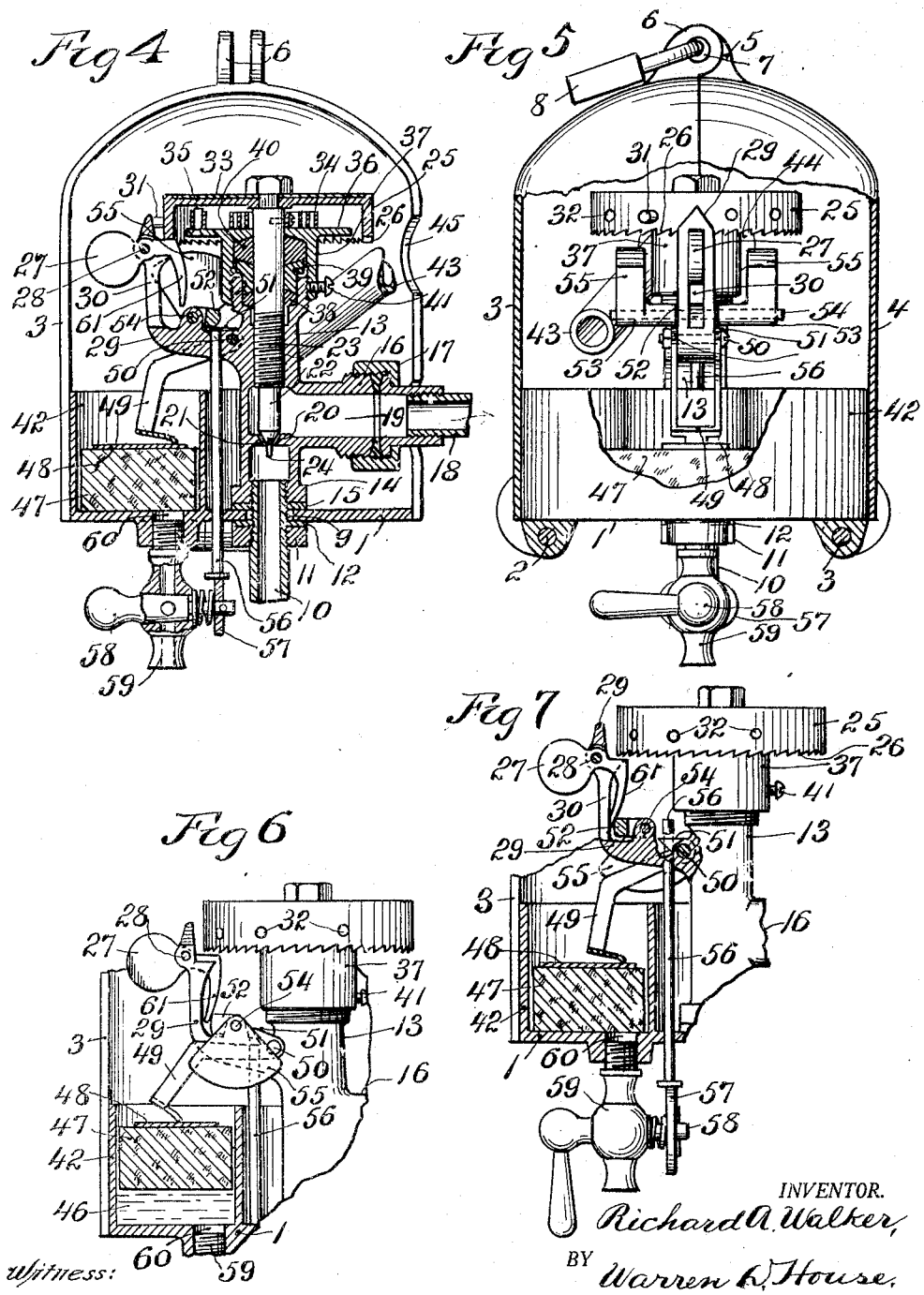
INVENTOR.
Richard A. Walker,
BY Warren D. House,
his ATTORNEY.

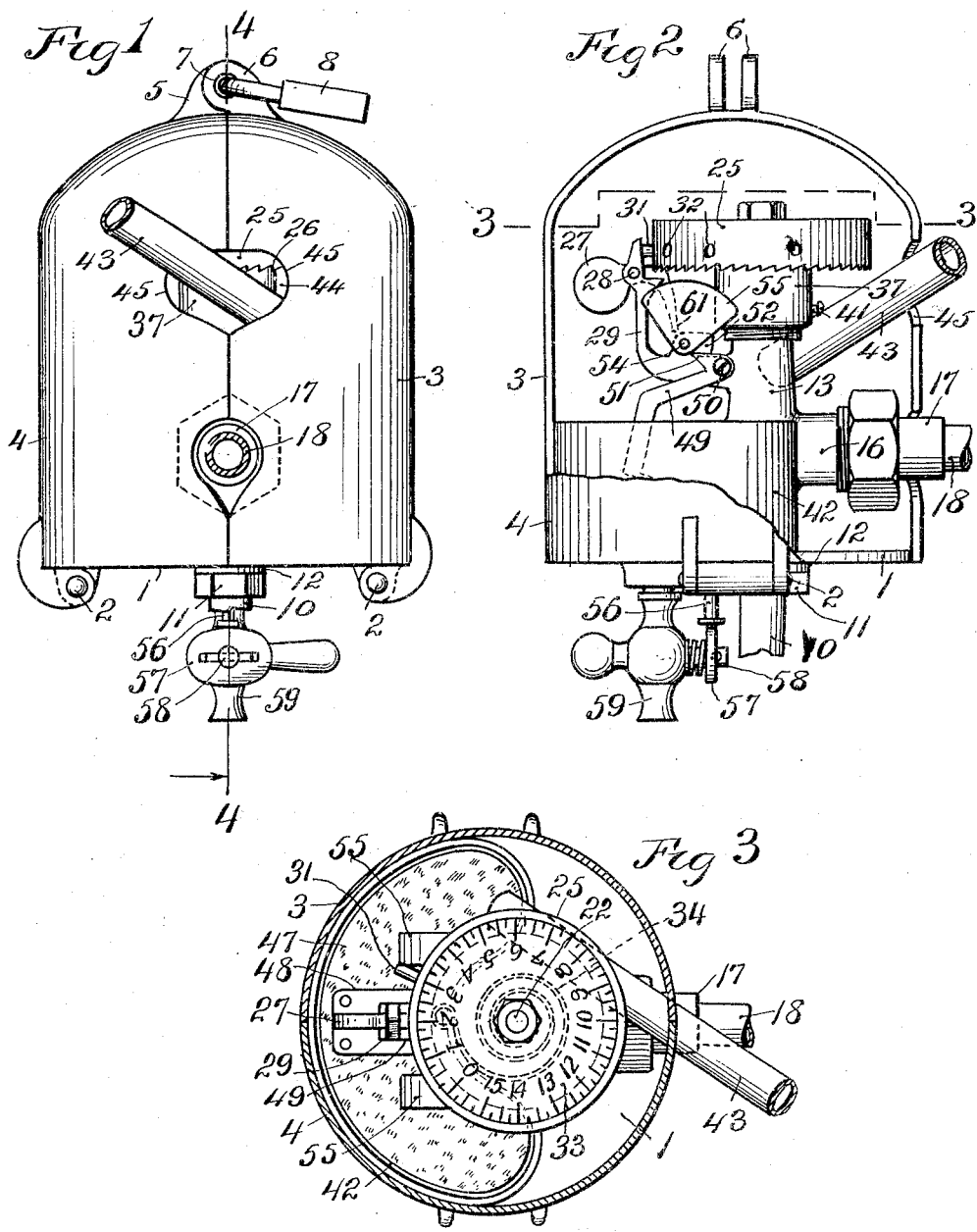

Patented Aug. 6, 1929.

1,723,102

UNITED STATES PATENT OFFICE.

RICHARD A. WALKER, OF SKIDMORE, MISSOURI.

AUTOMATIC CUT-OFF VALVE MECHANISM.

Application filed April 3, 1926. Serial No. 99,599.

My invention relates to improvements in automatic cut off valve mechanisms.

It is particularly well adapted for use in connection with oil burners, to cut off the supply of oil to the burner, should an overflow occur from the latter.

One of the objects of my invention is to provide a novel cut off valve mechanism of the kind described, having an automatically closing valve controlling the supply of oil to the burner, a detent for holding the valve in the open position to which it is set, and novel float actuated means, operated by overflow oil from the burner, by which the detent is released from said valve to permit the latter to close.

My invention provides further in the said float actuated means novel means for preventing the detent from being again engaged with the valve until after the float has been permitted to lower to an inactive position.

My invention provides still further a safety drain valve by which the lowering of the float is manually controlled.

My invention provides also novel means actuated by said safety valve for engaging said float actuated means to prevent the latter from releasing the detent unless the safety valve has been manually set to the safety closed position after having been set to the open draining position.

My invention provides still further novel adjustable means by which the cut off valve can not be opened more than a predetermined amount.

My invention provides also a novel lock controlled casing for enclosing some of the valve mechanism to prevent unauthorized interference with the mechanism.

My invention also provides the cut off valve with novel means for preventing foreign substances in the oil from obstructing the valve passage.

My invention provides still further a novel cut off valve mechanism of the kind described, which is relatively simple, cheap to make, durable, not liable to get out of order, which can be applied to oil burner systems now in use, which affords a maximum of safety, and which is efficient in operation.

The novel features of my invention are hereinafter fully described and claimed.

In the accompanying drawings, which illustrate the preferred embodiment of my invention, Fig. 1 is a side elevation of my improved cut off valve mechanism.

Fig. 2 is a side view of the same, partly broken away.

Fig. 3 is a cross section on the plane of the line 3—3 of Fig. 2.

Fig. 4 is a sectional view on the line 4—4 of Fig. 1, the parts being shown in the operative position with the cut off valve open.

Fig. 5 is another side view of the mechanism, partly in elevation, partly in section, and partly broken away, the parts being shown in the positions occupied by them in Figs. 1 to 5.

Fig. 6 is a fragmental view, partly in elevation, and partly in vertical section, the float being shown in the raised position, and the detent released from the cut off valve.

Fig. 7 is a view similar to Fig. 6, the float being shown lowered, the safety drain valve open, and the detent in the released position.

Similar reference characters designate similar parts in the different views.

My improved mechanism is provided with a casing comprising a base member 1, to opposite edges of which are respectively hinged by horizontal pins 2, semi-cylindrical side members 3 and 4, the upper end of the side member 4 having a lug 5 adapted to be disposed between two lugs 6 on the closed upper end of the side member 3. The lugs 5 and 6 have registering transverse holes 7 adapted to receive the hasp of the padlock 8, by which the side members may be held in the closed position, Figs. 1 and 5, to prevent unauthorized tampering with.

The base member 1 has a hole 9 in its bottom, through which extends a vertical oil supply pipe 10, having mounted on it a nut 11 which bears against a gasket 12, which bears on the underside of the base member 1.

A valve casing 13 has at its lower end a vertical tubular threaded stem 14, which is fitted on the upper end of the pipe 10, and which bears on a gasket 15, which bears against the upper side of the bottom of the base member 1, whereby the base member is supported on the supply pipe 10.

The casing 13 has a lateral horizontal tubular stem 16, which is connected by a coupling 17 with a pipe 18, which leads to the burner to be supplied with oil, and not shown.

The casing 13, in the stems 14 and 16, has an oil passage 19 in which is provided a valve seat 20, Fig. 4, against which is adapted to seat a conical portion 21 of a vertical stem 22 of a cut off valve, said stem 22 having a threaded portion 23 revolubly fitted in the casing 13. The lower end of the valve stem 22 has a projection 24, which when the stem is not seated on the seat 20, extends below said seat, and prevents any foreign substance in the oil from lodging against the under side of the valve seat and stopping the flow of oil through the passage 19.

The upper end of the valve stem 22 has secured to and rotatable with it an inverted cup shaped hand wheel 25, the lower edge of which is provided with a circular row of ratchet teeth 26 adapted to be normally engaged by a detent comprising a pawl 27, which is pivoted by a horizontal pin 28 to an upstanding arm 29 of the valve casing 13, said arm having a vertical slot 30 in which the pawl detent 27 is disposed. The arm 29 extends upwardly above the lower edge of the hand wheel 25 at the outerside thereof, and is disposed in the path of a horizontal stop pin 31, which is adapted to be removably mounted in any one of a horizontal row of radial holes 32, which are spaced from each other and are provided in the periphery of the hand wheel 25. The pin 31 contacting with the arm 29 limits the counter-clockwise rotation of the wheel 25, viewed from above, thereby limiting the opening movement of the valve stem 22.

To the upper side of the handwheel 25 is secured and rotatable therewith a circular numbered and graduated dial plate 33, Fig. 3, the numbers and graduations of which cooperate with the pointed upper end of the arm 29 to indicate the relative amounts of oil supplied to the burner past the valve seat 20. Thus when the pin 31 is disposed in the hole 32 alining with the numeral "3," the hand wheel 25 can be turned to any open position between "0" and "3," but no further. This prevents careless turning of the hand wheel to a position in which too much oil will be supplied the burner.

For automatically turning the hand wheel 25 and stem 22 to the closed or "0" position, when the hand wheel is freed from the pawl detent 27, a convolute spring 34, mounted in the hand wheel 25 and encircling the stem 22, has one end secured to the stem 22, and the other end secured to an upstanding pin 35 mounted in the top of a disk 36.

The disk 36 on its under side is provided with a hollow internally threaded boss 37 which encircles and is spaced from the stem 22, the latter being extended through and rotatable in the disk 36. The boss 37 is adjustably fitted on the externally threaded upper end of the valve casing 13. Packing 38 encircles the stem 22 in the casing 13 and bears at its under side against the latter. A ring 39 encircles the stem 22 and bears against the upper side of the packing 38, and is slidable on the stem 22. Packing 40 encircles the stem 22 and bears at its lower side against the ring 39 and at its upper side against the under side of the disk 36. The latter thus forms one member of a stuffing box for the valve stem 22. A set screw 41 is mounted in the boss 37, and is adapted to bear against the periphery of the casing 13 to hold the disk 36 from accidental turning on the casing 13.

The tension of the spring 34 is such as to normally retract the hand wheel 25 and valve stem 22 to the closed "0" position, by turning the stem 22 clockwise from the position to which it has been manually turned.

In case of an overflow of oil occurs at the burner, the pawl detent 27 is automatically released by float actuated means operated by the overflow oil, as will now be described.

The upper side of the base member 1 is provided with an oil receptacle 42, which may be of arcuate form, and of which the base member 1 forms the bottom. An oil overflow pipe 43 leads downwardly from the burner, to which it is connected in the manner usual with devices of this general character, and extends through a lateral hole, 44, provided by two registering notches 45 in adjacent edges respectively of the side members 3 and 4, and extends over and discharges the overflow oil into the oil receptacle 42.

Vertically movable by the overflow oil 46, Fig. 6, entering the receptacle 42, is a float 47, which may be cork, as shown, or any suitable buoyant material.

On the top of the float 47 is fastened a horizontal flat plate 48, having a smooth upper side upon which rests by gravity a U shaped lever 49, the arms of which are pivoted on a horizontal bolt 50 mounted in the arm 29 of the valve casing 13.

The arms of the U shaped lever 49 are respectively provided with two projections or fingers 51, which are disposed at the same side of the bolt 50 as the transverse portion of the lever 49, which portion rests on the plate 48.

The upper edges of the projections or fingers 51, when the device is in the normal operative position, Figs. 2 and 4, engage the under side of a U shaped crank 52 of a horizontal rock shaft 53, which is pivotally mounted on a horizontal pin 54, which is mounted in the arm 29 of the casing 13. Opposite ends of the rock shaft 53 are respectively provided with lateral enlargements comprising weights 55, which are so disposed as to be swung past a balance point and hold the crank 52 in contact with the projections or fingers 51, when the float 47 is in the lowered position, shown in Figs. 4, 5 and 7, when a vertical rod 56, the upper end of which is also adapted to engage the under side of the crank 52, is in the lowered position, shown in Fig. 4.

The rod 56 is vertically slidable in holes provided respectively in the arm 29 and the base member 1, and its lower end rests by gravity on the periphery of an elliptical cam 57, which is fastened to and rotatable with the rotary stem 58 of a safety drain valve 59, the threaded upper end of which is fitted in a threaded vertical hole 60 in the base member 1, said hole communicating with the interior of the receptacle 42. When the valve stem 58 is in the closed position, shown in Figs. 1, 2, 4 and 5, the rod 56 rests on the narrow diameter of the cam 57, and the rod 56 is out of contact with the crank 52.

The crank 52 is swung upwardly by the projections or fingers 51 to a position in which the weights 55 will pass a balance point and will rock the shaft 53 to the position shown in Fig. 6, when over flow oil 46 raises the float 47, thereby upwardly swinging the lever 49 and with it the fingers 51.

The pawl detent 27 has a downwardly extending arm 61, which is in the path of the crank 52, so that when the weights 55 swing the rock shaft 53 counter-clockwise, Fig. 4, the crank 52 will engage the arm 61, and will swing and hold the detent 27 from engagement with the teeth 26 of the hand wheel 25, thus permitting the spring 34 to turn the valve stem 22 to the closed position, and thus cutting off the supply of oil to the burner.

As long as the oil is in the receptacle 42, the float 47 will not lower, and the fingers 51 will keep the elevated position, shown in Fig. 6, thereby preventing the rock shaft 53 from being swung to a position, in which the weights 55 will hold the crank 52 in the normal position, Fig. 4. Thus if the hand wheel is turned to the open position, to supply oil to the burner, as soon as it is released, the spring 34 will retract the hand wheel 25 to the closed position. So, if the oil 46 is not withdrawn from the receptacle 42 by opening the valve stem 58 of the safety drain valve 59, the hand wheel will automatically close and the burner can not be operated, nor oil supplied to it.

For the reasons stated, the valve stem 58 is turned to the open position, shown in Fig. 7, upon which the oil 46 will be discharged from the receptacle 42 and the float 47 will lower to the position shown in Figs. 4 and 7, thus swinging the lever 49 to withdraw the fingers 51 from the raised position, Fig. 6, to the lowered position Fig. 4.

When the valve stem 58 is turned to the open position, Fig. 7, the cam 57 will have its longer diameter vertically disposed, thus lifting the rod 56 to the position shown in Fig. 7, in which position it will be adapted to engage the crank 52, and keep the rock shaft 53 from being rocked to a position in which the weights 55 will hold it in the normal position, but, if the rock shaft 53 is manually swung to permit the detent pawl 27 to engage the teeth 26, as soon as the rock shaft is released, the weights 55 will swing it to the position shown in Fig. 6, in which position, the crank 52 will engage the arm 61 of the detent pawl 27 and will hold said pawl from engaging and holding the hand wheel 25, so that the latter will not stay open, if the operator turns it to the open position.

After the oil has been drained from the receptacle 42, to again continuously operate the burner, the valve stem 58 must again be turned to the closed position, Fig. 4, upon which the cam 57 will turn to the position in which its shorter diameter will be vertical, thereby permitting the rod 56 to lower to the position shown in Fig. 4, in which position it will permit the crank 52 to swing to the operative position resting on the lowered fingers 51, Figs. 1 and 2.

From the foregoing, it will be understood, that, after an overflow occurs, to operate the burner again, the operator must first turn the safety valve stem 58 to the draining or open position, Fig. 7. Then he must turn the valve stem 58 to the closed position, to lower the rod 56, to get it out of the way of the crank 52 and to place the float in operative condition again, and finally he must swing the rock shaft 53 to the operative position, Fig. 4, in which it will rest on the fingers 51, and will permit the pawl detent 27 to re-engage the teeth 26 of the hand wheel 25, so as to hold the latter in the open position, after it has been turned to that position.

In the operation of the device, the pin 31 is positioned in the hole 32 in the hand wheel 25, in which the hand wheel can be opened to a position to suit the amount of oil required for the burner. The rock shaft 53 is turned to the position, shown in Fig. 4, in which the crank 52 will rest on the fingers 51. The valve stem 58 is closed, and the hand wheel 25 is turned to a predetermined position, such, for example, so that the numeral "2" will register with the pointed upper end of the arm 29.

If the burner should overflow, by the flame becoming extinguished, or otherwise, the overflow oil will pass into the receptacle 42, thus lifting the float 47, and swinging the lever 49 so that the fingers 51 will swing the crank 52 upwardly, upon which the weights 55 will rock the shaft 53 to the position shown in Fig. 6, and the crank 52 will engage the arm 61 of the detent pawl 27, thereby swinging the latter from and holding it out of engagement with the teeth 26 of the hand wheel 25. The spring 34 will then turn the valve stem 22 to the closed position, thus shutting off the oil supply to the burner.

The operator, to again use the burner, turns the safety valve stem 58 to the open position, Fig. 7, and after draining the oil 46 out of the receptacle 42, he turns the stem 58 to the closed position, Fig. 4. He will unlock the padlock 8 and swing the side members 3 and 4 open so as to have access to the valve mechanism within said members. He then swings the rock shaft 53 to the position shown in Fig. 4, and turns the hand wheel 25 to the desired open position, upon which oil will then be supplied to the burner until the operator closes the valve stem 22, or until an overflow from the burner occurs, upon which the operations above described will be performed.

In case that any one tampering with the valve 58, should move it to the open position, the cam 57 would cause the rod 56 to engage the crank 52 and rock the shaft 53 so as to release the pawl detent 27 from the hand wheel 25, upon which the valve stem 22 would be closed by the spring 34, and the oil supply to the burner would be cut off, and would remain cut off until the valve 58 had again been closed and the rock shaft 53 restored to its original position, thereby freeing the pawl detent 27, so that it would automatically swing into engagement with the teeth 26 of the hand wheel 25.

From the above, it will be noted that the burner can not be operated when the float is lifted, as the lever fingers 51 will prevent the crank 52 passing to a position in which the weights 55 will hold the rock shaft from rocking from engagement with said fingers. It will also be noted that the burner can not be operated until the safety valve stem 58 is opened to permit the float to fall, nor until, after draining the receptacle 42, the valve stem 58 is again turned to the closed safety position, and the weighted rock shaft 53 has been restored to its position in which its crank 52 is in the path of the fingers 51.

The failure of the operator to perform any one of the operations, of opening the safety valve to drain the receptacle 42, closing said valve to lower the rod 56, or neglecting to restore the weighted rock shaft 53 to its proper initial position, will prevent the burner from being supplied with oil, as all of these operations are necessary to permit the detent pawl 27 engaging the hand wheel 25 to hold the valve stem 22 in the open position. The device is, therefore, practically fool proof and possesses a maximum of safety.

By reason of the cut off valve casing 13, valve 22 and its retracting spring 34 being located in a closed case, comprising the base member 1 and the side members 3 and 4, there is small liability of serious fire damage to the device, in case a small fire should occur locally at the outer side of the case.

I do not limit my invention to the structure shown and described, as many modifications, within the scope of the appended claims, may be made without departing from the spirit of my invention.

What I claim is:—

1. In a valve mechanism of the kind described, a valve casing having an oil passage provided with a valve seat, a valve movable in said casing to and from said seat, means constantly exerting pressure against said valve for forcing said valve against said seat, a detent movable automatically to a position in which it will engage and hold the valve from moving from an open to the closed position, an oil receptacle adapted to receive overflow oil from a burner with which said passage is adapted for connection, a float in said receptacle adapted to be raised by overflow oil entering said receptacle, and means forced by said float for disengaging and holding said valve holding means disengaged from said valve, when the float rises to a predetermined position.

2. In a valve mechanism of the kind described, a valve casing having an oil passage provided with a valve seat and adapted for connection with a burner, a valve movable in said casing to and from said seat, means constantly exerting pressure against said valve for forcing said valve against said seat, a detent automatically movable to a position in which it will engage and hold said valve from moving from an open position to the closed position, an oil receptacle adapted to receive overflow oil from said burner, a float in said receptacle adapted to be raised by overflow oil entering said receptacle, a rocking member movable to two positions and having an actuating weight movable past a balance point and disposed so as to hold said rocking member in either of said positions, said rocking member having means, which, when said member is swung from one of said positions to the other position, engages said detent and disengages it and holds it disengaged from said valve until said rocking member is swung back to the initial first named position, and means forced by said float in rising for swinging said rocking member from said initial position.

3. In a valve mechanism of the kind described, a valve casing having an oil passage provided with a valve seat and adapted for connection with a burner, a valve movable in said casing to and from said seat, means constantly exerting pressure against said valve for forcing said valve against said seat, means for automatically engaging said valve to hold it from moving from an open to a closed position, an oil receptacle adapted to receive overflow oil from said burner, a float in said receptacle adapted to be raised by overflow oil entering said receptacle, a member having an actuating weight movable past a balance point and disposed so as to hold said member either in an initial inactive position or in an active position, said member having means, which, when said member is moved from the inactive to the active position, engages said valve holding means and disengages it and holds it disengaged from said valve until said member is retracted to its initial position, and means forced by said float in rising for moving said member from its initial position.

4. In a valve mechanism of the kind described, a valve casing having an oil passage provided with a valve seat and adapted for connection with a burner, a valve movable in said casing to and from said seat, means constantly exerting pressure against said valve for forcing said valve against said seat, means for automatically engaging said valve to hold it from moving from an open to a closed position, an oil receptacle adapted to receive overflow oil from said burner, a float in said receptacle adapted to be raised by overflow oil in said receptacle, means movable from an initial inactive position to an active position and arranged, when so moved to engage said valve holding means and disengage it and hold it disengaged from said valve until said movable means is retracted to its initial position, and means forced by said float in rising for engaging and moving said movable means from the initial position of the latter.

5. In a valve mechanism of the kind described, a valve casing having an oil passage provided with a valve seat and adapted for connection with a burner, a valve movable in said casing to and from said seat, means for automatically normally forcing said valve against said seat, means for automatically engaging said valve to hold it from moving from the open to a closed position, an oil receptacle adapted to receive overflow oil from said burner, a float in said receptacle adapted to be raised by overflow oil in said receptacle, a rocking member movable from an inactive initial position to an active position and having an actuating weight arranged to hold said rocking member in either of said positions, said rocking member having a crank disposed so as to engage said valve holding means and disengage it and hold it disengaged from said valve, when said rocking member is swung from the inactive initial position to the active position, and a lever engaging and actuated by said float in rising for engaging said crank to swing the rocking member from the initial position and arranged to hold the rocking member from retraction to the initial position until said float falls.

6. In a valve mechanism of the kind described, a valve casing having an oil passage with a valve seat and adapted for connection with a burner, a valve movable in said casing to and from said seat, means constantly exerting pressure against said valve for forcing said valve against said seat, means arranged to automatically hold said valve in an open position, an oil receptacle adapted to receive overflow oil from said burner, a float in said receptacle adapted to be raised by oil in said receptacle, means movable from an inactive initial position to an active position and having means for yieldingly holding it in either of said position, and arranged, when moved from the initial position to disengage and to hold disengaged said valve holding means from said valve, and means forced by said float in rising for moving said movable means from its initial inactive position.

7. In a valve mechanism of the kind described, a valve casing having an oil passage with a valve seat and adapted for connection with a burner, a valve movable in said casing to and from said seat, a pivoted detent automatically movable to a position in which it will engage and hold said valve in an open position, means for automatically forcing said valve to the closed position, an oil receptacle adapted to receiving overflow oil from said burner, a float in said receptacle adapted to be raised by oil in said receptacle, a rocking member having a crank disposed so as to engage and swing said detent from and hold it out of engagement with said valve, when said member is swung from an initial inactive position to an active position, said member having yielding means arranged to hold it in either of said two positions, and a lever engaging said float and arranged to be moved by the float in rising to a position in which it will engage said crank and swing said rocking member from the initial position of the latter and prevent the rocking member being retracted to the initial position until the float lowers.

8. In a valve mechanism of the kind described, a valve casing having an oil passage provided with a valve seat and adapted for connection with a burner, a valve movable in said casing to and from said seat, means for automatically forcing said valve against said seat, means arranged to automatically hold the valve in an open position, an oil receptacle adapted to receive overflow oil from said burner and having an oil drain outlet, a valve casing communicating with said outlet, a drain valve movable in said last-named casing to and from an open position, a float in said receptacle adapted to be raised by oil in said receptacle, means actuated by said float in rising for disengaging said valve holding means and holding it disengaged from said valve until said float lowers, and means actuated by said drain valve, when moved to the open position, for engaging said float actuated means and holding it from retraction to its initial position until said drain valve is closed.

9. In a valve mechanism of the kind described, a valve casing having an oil passage provided with a valve seat and adapted for connection with a burner, a valve movable in said casing to and from said seat, means for automatically forcing said valve against said seat, means arranged to automatically hold said valve in an open position, an oil receptacle adapted to receive overflow oil from said burner and having an oil drain outlet, a drain valve casing communicating with said outlet, a drain valve movable in said drain valve casing to and from an open position, a float in said receptacle adapted to be raised by oil in said receptacle, a rocking member having a crank arranged, when said rocking member is swung from an initial inactive position to an active position, to engage said valve holding means and to disengage it and hold it disengaged from said valve, means actuated by said float in rising for engaging said crank to swing said rocking member from the initial position and to hold it from retraction to said initial position until the float lowers, a cam secured to said drain valve, and means actuated by said cam, when said drain valve is moved to the open position for obstructing the movement of said rocking member to its initial position until said drain valve is closed.

In testimony whereof I have signed my name to this specification.

RICHARD A. WALKER.